United States Patent
Zhao et al.

(10) Patent No.: US 10,857,733 B2
(45) Date of Patent: Dec. 8, 2020

(54) THREE-DIMENSIONAL (3D) PRINTING WITH DISCOLORABLE NEAR-INFRARED ABSORBING DYE

(71) Applicant: HEWLETT-PACKARD DEVELOPMENT COMPANY, L.P., Houston, TX (US)

(72) Inventors: Yan Zhao, Palo Alto, CA (US); Lihua Zhao, Palo Alto, CA (US); Paul Olubummo, Palo Alto, CA (US); Aja Hartman, Palo Alto, CA (US); Howard S. Tom, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 242 days.

(21) Appl. No.: 16/077,753

(22) PCT Filed: Feb. 6, 2017

(86) PCT No.: PCT/US2017/016679
§ 371 (c)(1),
(2) Date: Aug. 14, 2018

(87) PCT Pub. No.: WO2018/144032
PCT Pub. Date: Aug. 9, 2018

(65) Prior Publication Data
US 2019/0077080 A1   Mar. 14, 2019

(51) Int. Cl.
*B29C 64/268* (2017.01)
*B29C 64/165* (2017.01)
(Continued)

(52) U.S. Cl.
CPC .......... *B29C 64/268* (2017.08); *B29C 64/165* (2017.08); *B29C 64/291* (2017.08);
(Continued)

(58) Field of Classification Search
CPC ... B29C 64/268; B29C 64/165; B29C 64/393; B29C 64/291; B33Y 70/00
See application file for complete search history.

(56) References Cited

U.S. PATENT DOCUMENTS

| 8,324,300 B2 | 12/2012 | Adochio et al. |
| 2007/0092836 A1 | 4/2007 | Inno et al. |

(Continued)

FOREIGN PATENT DOCUMENTS

| CN | 104312449 A | 1/2015 |
| CN | 104559196 A | 4/2015 |

(Continued)

*Primary Examiner* — Joseph S Del Sole
*Assistant Examiner* — Mohamed K Ahmed Ali
(74) *Attorney, Agent, or Firm* — Dierker & Kavanaugh PC

(57) ABSTRACT

In an example of a three-dimensional (3D) printing method, a polymeric or polymeric composite build material is applied. A fusing agent is selectively applied on at least a portion of the polymeric or polymeric composite build material. The fusing agent includes a discolorable near-infrared absorbing dye, a thiol surfactant, a reducing agent, and a balance of water. Near-infrared radiation is applied to the polymeric or polymeric composite build material at a condition that maintains a temperature of the selectively applied fusing agent below a decomposition temperature of the fusing agent and that allows the discolorable near-infrared absorbing dye to harvest near-infrared radiation energy, in order to fuse the portion of the polymeric or polymeric composite build material in contact with the fusing agent to form a layer and to initiate discoloration of the discolorable near-infrared absorbing dye in the layer.

13 Claims, 4 Drawing Sheets

(51) Int. Cl.
  *B29C 64/291* (2017.01)
  *B29C 64/393* (2017.01)
  *C09D 11/50* (2014.01)
  *B33Y 70/00* (2020.01)
  *B33Y 10/00* (2015.01)

(52) U.S. Cl.
  CPC ............ *B29C 64/393* (2017.08); *C09D 11/50* (2013.01); *B33Y 10/00* (2014.12); *B33Y 70/00* (2014.12)

(56) References Cited

U.S. PATENT DOCUMENTS

| | | |
|---|---|---|
| 2008/0070349 A1 | 3/2008 | Matayabas et al. |
| 2015/0232648 A1* | 8/2015 | Hsueh ..................... C08K 3/34 264/308 |
| 2015/0366327 A1* | 12/2015 | LaHood, Sr. ........ A45D 33/003 264/109 |
| 2016/0198576 A1* | 7/2016 | Lewis .................. B29C 64/118 361/761 |
| 2016/0297143 A1* | 10/2016 | Ganapathiappan .... A01N 43/80 |
| 2018/0354191 A1* | 12/2018 | Nauka .................. B29C 64/218 |

FOREIGN PATENT DOCUMENTS

| | | |
|---|---|---|
| WO | 2016072966 A1 | 5/2016 |
| WO | 2017014785 A1 | 1/2017 |
| WO | 2017019102 A1 | 2/2017 |

* cited by examiner

THREE-DIMENSIONAL (3D) PRINTING WITH DISCOLORABLE NEAR-INFRARED ABSORBING DYE

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
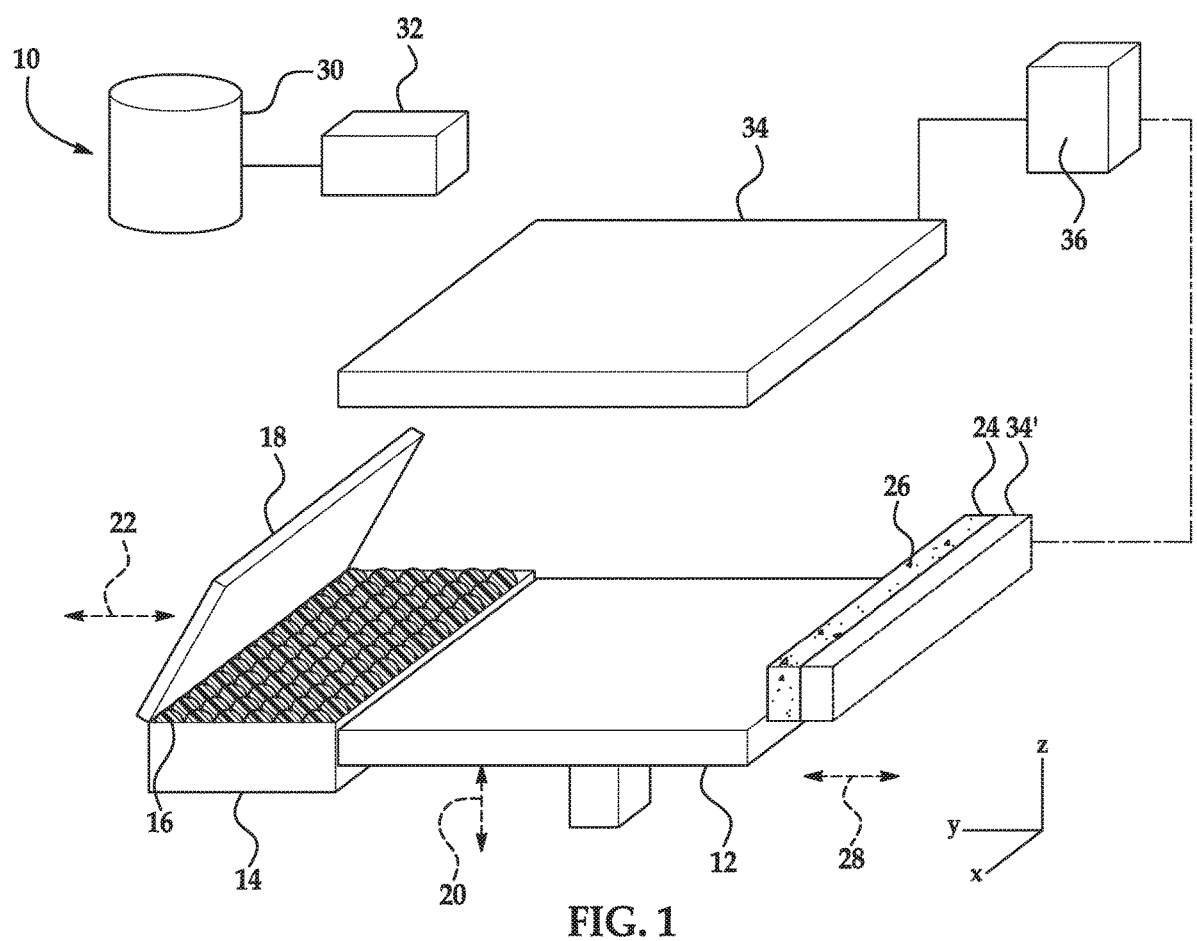
FIG. 1 is a simplified isometric and schematic view of an example of a 3D printing system disclosed herein.

Examples of the three-dimensional (3D) printing method and the 3D printing system disclosed herein utilize Multi Jet Fusion (MJF). During MJF, an entire layer of a build material (also referred to as build material particles) is exposed to radiation, but a selected region (in some instances less than the entire layer) of the build material is fused and hardened to become a layer of a 3D part. A fusing agent is selectively deposited in contact with the selected region of the build material. The fusing agent(s) is capable of penetrating into the layer of the build material and spreading onto the exterior surface of the build material. This fusing agent is capable of absorbing radiation and converting the absorbed radiation to thermal energy, which in turn melts or sinters the build material that is in contact with the fusing agent. This causes the build material to fuse, bind, cure, etc. to form the layer of the 3D part.

As used herein, the terms "3D printed part," "3D part," or "part" may be a completed 3D printed part or a layer of a 3D printed part.

Some fusing agents used in MJF tend to have significant absorption (e.g., 80%) in the visible region (400 nm-780 nm). This absorption generates heat suitable for fusing during 3D printing, which leads to 3D parts having mechanical integrity and relatively uniform mechanical properties (e.g., strength, elongation at break, etc.). This absorption, however, results in strongly colored, e.g., black, 3D parts. In some instances, it may not be desirable to generate strongly colored parts. Rather, it may be desirable to generate a part that is white, off-white, or some color other than black.

Examples of the fusing agent, utilized in examples of the method and system disclosed herein, contain a discolorable near-infrared absorbing dye. The discolorable near-infrared absorbing dye, and the fusing agent containing the discolorable near-infrared absorbing dye, are capable of absorbing at least 80% of radiation having wavelengths ranging from about 800 nm to about 1400 nm. Like the visible region absorbing fusing agents, the absorption of the fusing agents including the discolorable near-infrared absorbing dye generates heat suitable for fusing polymeric or polymeric composite build material in contact therewith during 3D printing, which leads to 3D parts having mechanical integrity and relatively uniform mechanical properties (e.g., strength, elongation at break, etc.).

The absorption maximum of some examples of the discolorable near-infrared absorbing dyes disclosed herein may undergo a bathochromic shift (e.g., further into the near-infrared region toward the medium infrared region) or a hypsochromic shift (e.g., in the near-infrared region toward the visible region) depending upon the chemistry of the dye and/or fusing agent. As examples, the shift may depend upon a reducing agent present in the fusing agent and/or depending upon the nature of the functional group(s) attached to the dye.

In addition to fusing the polymeric or polymeric composite build material, the applied near-infrared radiation initiates discoloration of the discolorable near-infrared absorbing dye. As used herein, the terms "discoloration," "discolor," and "discolored" refer to the loss of color of the discolorable near-infrared absorbing dye due to its reduction. When the discoloration of the discolorable near-infrared absorbing dye is complete, the discolorable near-infrared absorbing dye may be at least substantially colorless. By "at least substantially colorless," it is meant that the original color of the dye changes or fades to a point that the formed part exhibits a color of the build material, a color of a colorant present in the fusing agent, or a color of a colorant subsequently applied to the part. Thus, the fusing agent, containing the discolorable near-infrared absorbing dye, may be used to print white 3D parts, off-white 3D parts, or colored 3D parts.

As mentioned above, the discoloration of the dye may be due to its reduction. For some examples of the discolorable near-infrared absorbing dye, a reducing agent and a thiol surfactant are used that render the dye i) more soluble in the polar aprotic solvent and ii) readily reducible at room temperature (e.g., from about 18° C. to about 25° C.). For these dyes, an initial reduction may be initiated prior to fusing (e.g., during fusing agent formulation), which results in the dye changing color. It is to be understood that this change in color is not a loss of color (i.e., is not discoloration as defined herein), and the initially reduced dye still readily absorbs the applied near-infrared radiation. In the examples disclosed herein, reduction of the dye or further reduction of the dye may take place during and/or after fusing. While not being bound to any theory, it is believed that the discolorable near-infrared absorbing dye may be (further) reduced to its discolored form due to the heat generated during fusing and/or on a build platform after fusing, the near-infrared radiation used during fusing, the components of the fusing agent, the polymeric or polymeric composite build material, or a combination thereof.

Referring now to FIG. 1, an example of a 3D printing system 10 is schematically depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The printing system 10 includes a build area platform 12, a build material supply 14 containing polymeric or polymeric composite build material particles 16, and a build material distributor 18.

The build area platform 12 receives the polymeric or polymeric composite build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

The build area platform 12 may be moved in a direction as denoted by the arrow 20, e.g., along the z-axis, so that polymeric or polymeric composite build material 16 may be delivered to the platform 12 or to a previously formed layer (see, e.g., FIG. 2E) of the 3D part. In an example, when the polymeric or polymeric composite build material particles 16 are to be delivered, the build area platform 12 may be programmed to advance (e.g., downward) enough so that the build material distributor 18 can push the polymeric or polymeric composite build material particles 16 onto the platform 12 to form a substantially uniform layer of the polymeric or polymeric composite build material 16 thereon (see, e.g., FIGS. 2A and 2B). The build area platform 12 may also be returned to its original position, for example, when a new part is to be built.

The build material supply 14 may be a container, bed, or other surface that is to position the polymeric or polymeric composite build material particles 16 between the build material distributor 18 and the build area platform 12. In some examples, the build material supply 14 may include a surface upon which the polymeric or polymeric composite build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the polymeric or polymeric composite build material particles 16 from a storage location to a position to be spread onto the build area platform 12 or onto a previously formed layer of the 3D part.

The build material distributor 18 may be moved in a direction as denoted by the arrow 22, e.g., along the y-axis, over the build material supply 14 and across the build area platform 12 to spread a layer of the polymeric or polymeric composite build material 16 over the build area platform 12. The build material distributor 18 may also be returned to a position adjacent to the build material supply 14 following the spreading of the polymeric or polymeric composite build material particles 16. The build material distributor 18 may be a blade (e.g., a doctor blade), a roller, a combination of a roller and a blade, and/or any other device capable of spreading the polymeric or polymeric composite build material 16 over the build area platform 12. For instance, the build material distributor 18 may be a counter-rotating roller.

The polymeric or polymeric composite build material particles 16 may be a polymeric build material or a polymeric composite build material. As used herein, the term "polymeric build material" may refer to crystalline or semi-crystalline polymer particles. As used herein, the term "polymeric composite build material" may refer or composite particles made up of polymer and ceramic. Any of the polymeric or polymeric composite build material particles 16 may be in powder form.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the build material particles 16 include polyethylene, polypropylene, and polyoxomethylene (i.e., polyacetals). Still other examples of suitable build material particles 16 include polystyrene, polycarbonate, polyester, polyurethanes, other engineering plastics, and blends of any two or more of the polymers listed herein.

Any of the previously listed crystalline or semi-crystalline polymer particles may be combined with ceramic particles to form the polymeric composite build material particles 16. Examples of suitable ceramic particles include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. The amount of ceramic particles that may be combined with the crystalline or semi-crystalline polymer particles may depend on the materials used and the 3D part to be formed. In one example, the ceramic particles may be present in an amount ranging from about 1 wt % to about 20 wt % based on the total wt % of the polymeric composite build material particles 16.

The polymeric or polymeric composite build material particles 16 may have a melting point or softening point ranging from about 50° C. to about 400° C. As an example, the build material particles 16 may be a polyamide having a melting point of 180° C.

The polymeric or polymeric composite build material particles 16 may be made up of similarly sized particles or differently sized particles. The term "size", as used herein with regard to the polymeric or polymeric composite build material particles 16, refers to the diameter of a spherical particle, or the average diameter of a non-spherical particle (i.e., the average of multiple diameters across the particle), or the volume-weighted mean diameter of a particle distribution. In an example, the average size of the polymeric or polymeric composite build material particles 16 ranges from 5 μm to about 200 μm.

It is to be understood that the polymeric or polymeric composite build material 16 may include, in addition to polymeric or polymeric composite particles, a charging agent, a flow aid, or combinations thereof.

Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the polymeric or polymeric composite build material 16.

Flow aid(s) may be added to improve the coating flowability of the polymeric or polymeric composite build material 16. Flow aid(s) may be particularly beneficial when the particles of the polymeric or polymeric composite build material 16 are less than 25 µm in size. The flow aid improves the flowability of the polymeric or polymeric composite build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the polymeric or polymeric composite build material 16.

As shown in FIG. 1, the printing system 10 also includes an applicator 24, which may contain the fusing agent 26 disclosed herein.

The fusing agent 26 disclosed herein generally includes a liquid vehicle and the discolorable near-infrared absorbing dye. The discolorable near-infrared absorbing dye allows the fusing agent 26 to absorb radiation at wavelengths ranging from about 800 nm to about 1400 nm, which enables the fusing agent 26 to convert enough radiation to thermal energy so that the polymeric or polymeric composite build material particles in contact with the fusing agent 26 fuse.

Some examples of the discolorable near-infrared absorbing dye may have a general formula I:

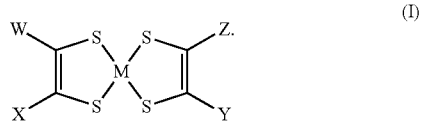

(I)

Examples of M include nickel, zinc, platinum, palladium, and molybdenum. Examples of each of W, X, Y, and Z include a hydrogen (H), a phenyl group (Ph), a phenyl group bonded to an R group (i.e., PhR), wherein R is $C_nH_{2n+1}$, or $OC_nH_{2n+1}$, or $N(CH_3)_2$, and a sulfur bonded to an R group (i.e., SR), wherein R is $C_nH_{2n+1}$, or $OC_nH_{2n+1}$, or $N(CH_3)_2$. In these examples, n may be greater than or equal to 2 and less than or equal to 12 (i.e., $2 \leq n \leq 12$). When the discolorable near-infrared absorbing dye has the general formula I, the strong near-infrared absorption of the discolorable near-infrared absorbing dye may be as a result of the electron delocalization about the dithiolene ring and the interaction of the delocalized electrons with the empty d-orbitals of the metal center.

Some other examples of the discolorable near-infrared absorbing dye include a diarylmethane dye, a triarylmethane dye, a tetraryldiamine dye, a nitroso dye, a cyanine dye, a nigrosine dye, an iminium dye, a diimminum dye, a squarilium dye, a croconium dye, a quinone dye, a phthalocyanine dye, an azo dye, and an indoaniline dye.

The amount of the discolorable near-infrared absorbing dye in the fusing agent 26 may range from about 1 wt % to about 3 wt % based on the total wt % of the fusing agent 26. In an example, the amount of the discolorable near-infrared absorbing dye present in the fusing agent 26 is about 1 wt % based on the total wt % of the fusing agent 26. It is believed that these discolorable near-infrared absorbing dye loadings provide a balance between the fusing agent 26 having jetting reliability and near-infrared radiation absorbance efficiency.

As mentioned above, the reducing agent may be included in the fusing agent 26 to at least partially dissolve the discolorable near-infrared absorbing dye and/or to reduce the discolorable near-infrared absorbing dye. As an example, using a polar aprotic solvent as the reducing agent may reduce the metal bis(dithiolene) complex to its monoanionic form or to its dianionic form according to equation II:

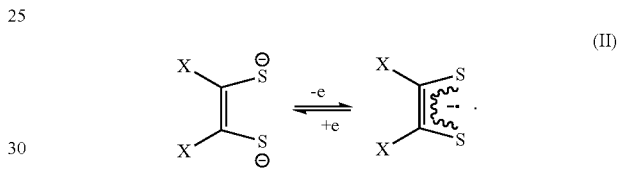

(II)

The reduction of the metal bis(dithiolene) complex to its monoanionic form or to its dianionic form (left side of equation II) changes the color of the metal bis(dithiolene) complex. For example, the initial reduction of a nickel bis(dithiolene) complex may result in the color changing from green to reddish brown. Other color changes may be observed with different metals in the complex. As noted above, the color changed dye can still absorb infrared radiation, and becomes at least substantially colorless during the application of the infrared-energy.

In some examples, the reducing agent is a polar aprotic solvent containing a tert-amide. In other examples, the reducing agent is a polar aprotic solvent containing a sec-amine or a tert-amine. In still other examples, the reducing agent is an organosulfur, a ketone, or an ether. Some specific examples of the reducing agent for the metal bis(dithiolene) complex include 1-methyl-2-pyrrolidone (1M2P), 2-pyrrolidone, 1-(2-hydroxyethyl)-2-pyrrolidone, dimethylformamide (DMF), dimethyl sulfoxide (DMSO), acetone, and combinations thereof. Reducing agents for the other dyes disclosed herein include sodium borohydride, ascorbic acid, monosaccharides, aldehydes, ketones, or any other agent that can reduce the particular dye. As examples, triarylmethane dyes and azo dyes can be reduced using monosaccharides, aldehydes, ketones, or ascorbic acid.

The reducing agent is present in the fusing agent 26 in an amount sufficient to at least partially dissolve the discolorable near-infrared absorbing dye and/or to reduce the discolorable near-infrared absorbing dye. In an example, the amount of the reducing agent in the fusing agent 26 may range from about 5 wt % to about 50 wt % based on the total wt % of the fusing agent 26. In another example, the amount of the reducing agent present in the fusing agent 26 is about 40 wt % based on the total wt % of the fusing agent 26. In still another example, the amount of the reducing agent present in the fusing agent 26 is about 50 wt % based on the total wt % of the fusing agent 26.

The thiol surfactant may be included in the fusing agent 26 to stabilize the discolorable near-infrared absorbing dye. More specifically, the thiol surfactant may facilitate the reduction of the discolorable near-infrared absorbing dye by the reducing agent. As one example, the thiol surfactant may render the metal bis(dithiolene) complex readily reducible and thus more soluble in the reducing agent. Without the thiol surfactant, the reduction of the metal bis(dithiolene) complex to its monoanionic form or to its dianionic form may require the mixture of the neutral, non-reduced metal bis(dithiolene) complex and the reducing agent to be heated to an elevated temperature (e.g., a temperature ranging from about 50° C. to about 200° C.) for an extended time period (e.g., a time period ranging from about 5 hours to about 48 hours). When the thiol surfactant is included in the mixture of the metal bis(dithiolene) complex and the reducing agent, the reduction of the metal bis(dithiolene) complex to its monoanionic form or to its dianionic form may be accomplished at room temperature (e.g., from about 18° C. to about 25° C.) and within a few seconds (e.g., less than 10 seconds).

The thiol surfactant may also improve the jettability of the fusing agent by stabilizing the discolorable near-infrared absorbing dye. Without the thiol surfactant, the discolorable near-infrared absorbing dye may precipitate out of solution when water or a liquid vehicle is added. When the thiol surfactant is included in the mixture of the discolorable near-infrared absorbing dye and the reducing agent, the reduced discolorable near-infrared absorbing dye can be easily formulated into (i.e., dissolved or dispersed rather than precipitated out of) a liquid vehicle.

An example of the thiol surfactant is dodecanethiol, 1-undecanethiol, 2-ethylhexanethiol, 1-octanethiol, 1-tetradecanethiol, or the like.

The thiol surfactant is present in the fusing agent 26 in an amount sufficient to stabilize the discolorable near-infrared absorbing dye. In an example, the amount of the thiol surfactant in the fusing agent 26 may range from about 1 wt % to about 5 wt % based on the total wt % of the fusing agent 26.

Figure 2A:
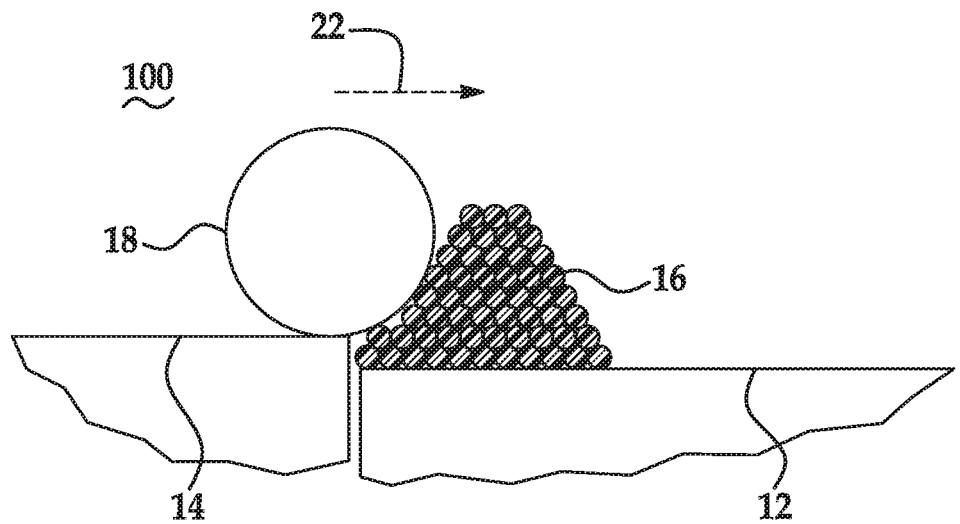
FIGS. 2A through 2E are schematic and partially cross-sectional views depicting the formation of a 3D part using examples of a 3D printing method disclosed herein.
Figure 2B:
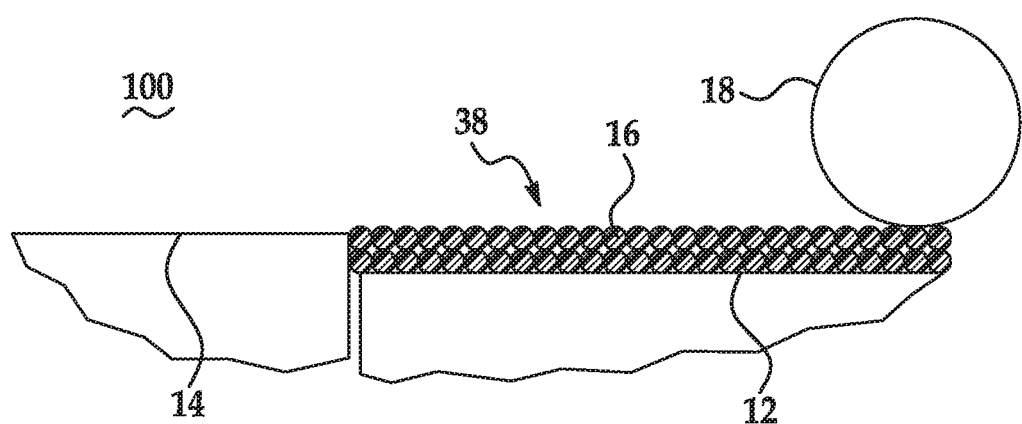
Figure 2C:
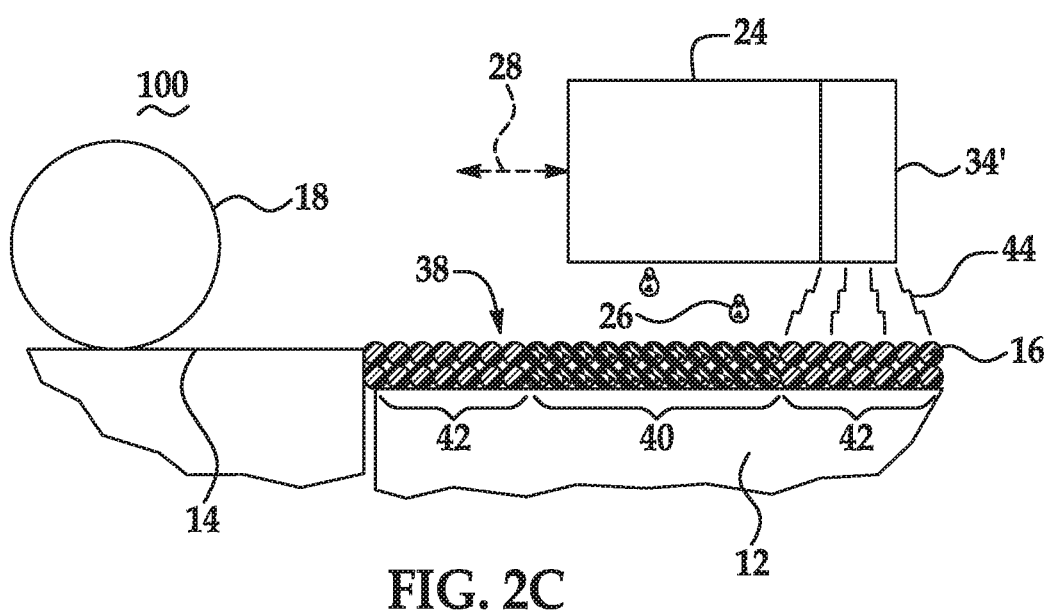
Figure 2D:
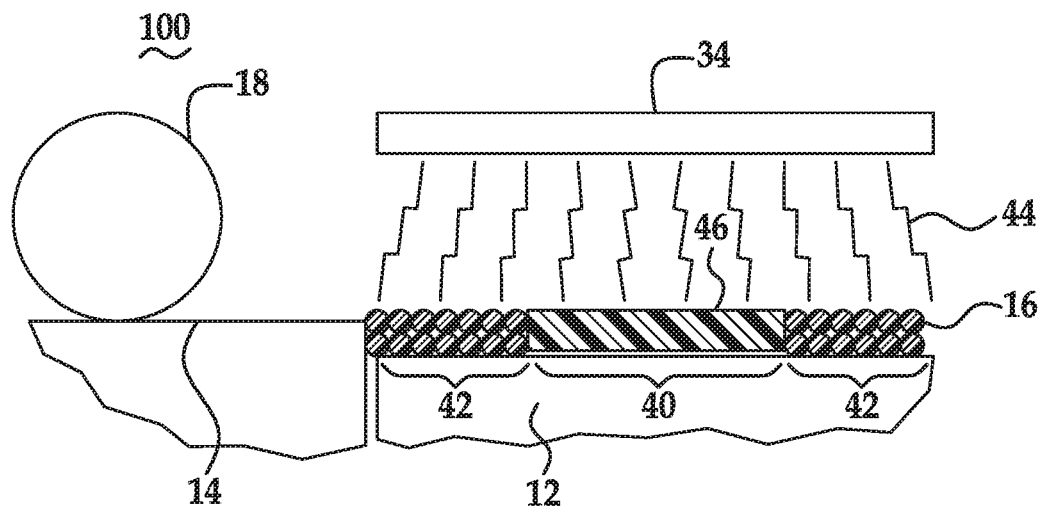

The reduction or further reduction and discoloration of the discolorable near-infrared absorbing dye are initiated by applying near-infrared radiation 44 (see, e.g., FIGS. 2C and 2D). In some instances, the application of the near-infrared radiation starts the reduction and discoloration processes. In other instances, the exposure of the dye to the reducing agent in the fusing agent 26 may start the reduction process and change the color of the dye, and the application of the near-infrared radiation 44 may further reduce the dye and initiate the discoloration process. When the discoloration of the discolorable near-infrared absorbing dye is complete, the discolorable near-infrared absorbing dye may be at least substantially colorless, which enables the 3D part to exhibit a color of the build material particles 16 (e.g., white or off-white) or to exhibit a color of a colorant present in the fusing agent 26. Again, while not being bound to any theory, it is believed that the discolorable near-infrared absorbing dye may be (further) reduced to its discolored form due to the heat generated during fusing and/or after fusing on the build material platform 12, the near-infrared radiation 44 to which the discolorable near-infrared absorbing dye and the polymeric or polymeric composite build material are exposed during fusing, the components of the fusing agent 26, the polymeric or polymeric composite build material, or a combination thereof.

As used herein, "FA vehicle" may refer to the liquid fluid in which the discolorable near-infrared absorbing dye. A wide variety of FA vehicles may be used with the fusing agent 26, system, and method of the present disclosure. The FA vehicle may include water in combination with a mixture of a variety of additional components. Examples of these additional components may include water soluble organic solvent(s), wetting agent(s), surface tension reduction agent(s), emulsifier(s), scale inhibitor(s), anti-deceleration agent(s), chelating agent(s), and/or antimicrobial agent(s).

One example FA vehicle includes water, the reducing agent, and the thiol surfactant, with or without one or more of the additional components. Another example FA vehicle consists of water, the reducing agent, and the thiol surfactant (without any other components).

The water in the FA vehicle may prevent (further) reduction of dye until the water is driven off as a result of the build material platform temperature and/or the temperature achieved during radiation exposure. After the water is driven off, the metal dye may be capable of being further reduced and becoming colorless/discolored, which enables the 3D part to exhibit a color of the build material (e.g., white or off-white) or to exhibit a color of a colorant present in the fusing agent 26.

The aqueous nature of the fusing agent 26 enables the fusing agent 26 to penetrate, at least partially, into the layer of the polymeric or polymeric composite build material particles 16. The build material particles 16 may be hydrophobic, and the presence of the wetting agent(s) in the fusing agent 26 may assist in obtaining a particular wetting behavior.

Examples of suitable wetting agents include non-ionic surfactants. Some specific examples include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In other examples, the wetting agent is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable wetting agents include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15S7, and TERGITOL™ 15S9 from The Dow Chemical Company). In some examples, an anionic surfactant may be used in combination with the non-ionic surfactant. In some examples, it may be desirable to utilize a wetting agent having a hydrophilic-lipophilic balance (HLB) less than 10.

The wetting agent(s) may be present in the fusing agent 26 in an amount ranging from about 0.1 wt % to about 4 wt % of the total wt % of the fusing agent 26. In an example, the amount of the wetting agent(s) present in the fusing agent 26 is about 0.1 wt % (based on the total wt % of the fusing agent 26). In another example, the amount of the wetting agent(s) present in the fusing agent 26 is about 0.04 wt % (based on the total wt % of the fusing agent 26).

The FA vehicle may also include surface tension reduction agent(s). Any of the previously mentioned wetting agents/surfactants may be used to reduce the surface tension. As an example, the surface tension reduction agent may be the self-emulsifiable, non-ionic wetting agent based on acetylenic diol chemistry (e.g., SURFYNOL® SEF from Air Products and Chemicals, Inc.).

The surface tension reduction agent(s) may be present in the fusing agent 26 in an amount ranging from about 0.1 wt % to about 4 wt % of the total wt % of the fusing agent 26. In an example, the amount of the surface tension reduction agent(s) present in the fusing agent 26 is about 1.5 wt % (based on the total wt % of the fusing agent 26). In another example, the amount of the surface tension reduction agent(s) present in the fusing agent 26 is about 0.6 wt % (based on the total wt % of the fusing agent 26).

When a surfactant is both a wetting agent and a surface tension reduction agent, any of the ranges presented herein for the wetting agent and the surface tension reduction agent may be used for the surfactant.

The FA vehicle may also include water soluble organic solvent(s). In some examples, the water soluble organic solvent(s) may be the same type of solvent as the reducing agent. In these examples, the water soluble organic solvent(s) may be 1-methyl-2-pyrrolidone, 2-pyrrolidone, 1-2(hydroxyethyl)-2-pyrrolidone, dimethylformamide (DMF), dimethyl sulfoxide (DMSO), acetone, or a combination thereof. In other examples, the water soluble organic solvent(s) may be different than the reducing agent. For example, two different polar aprotic solvents may be selected. For another example, the water soluble organic solvent(s) may be 1,5-pentanediol, triethylene glycol, tetraethylene glycol, 2-methyl-1,3-propanediol, 1,6-hexanediol, tripropylene glycol methyl ether, or combinations thereof.

The water soluble organic solvent(s) may be present in the fusing agent 26 in an amount ranging from about 2 wt % to about 80 wt % of the total wt % of the fusing agent 26. In an example, the amount of the water soluble organic solvent(s) present in the fusing agent 26 is about 40 wt % (based on the total wt % of the fusing agent 26). In another example, the amount of the water soluble organic solvent(s) present in the fusing agent 26 is about 16 wt % (based on the total wt % of the fusing agent 26).

The FA vehicle may also include emulsifier(s). Examples of suitable emulsifiers include oleth-3-phosphate (commercially available as CRODAFOS™ O3A or CRODAFOS™ N-3 acid) or dextran 500 k. Other suitable examples of the emulsifiers include CRODAFOS™ HCE (phosphate-ester from Croda Int.), CRODAFOS® N10 (oleth-10-phosphate from Croda Int.), etc.

The emulsifier(s) may be present in the fusing agent 26 in an amount ranging from about 0.1 wt % to about 2 wt % of the total wt % of the fusing agent 26. In an example, the amount of the emulsifier(s) present in the fusing agent 26 is about 1 wt % (based on the total wt % of the fusing agent 26). In another example, the amount of the emulsifier(s) present in the fusing agent 26 is about 0.4 wt % (based on the total wt % of the fusing agent 26).

The FA vehicle may include scale inhibitor(s) or anti-deceleration agent(s). One suitable scale inhibitor/anti-deceleration agent is an alkyldiphenyloxide disulfonate (e.g., DOWFAX™ 8390 and DOWFAX™ 2A1 from The Dow Chemical Company).

The scale inhibitor(s)/anti-deceleration agent(s) may be present in the fusing agent 26 in an amount ranging from about 0.05 wt % to about 5 wt % of the total wt % of the fusing agent 26. In an example, the scale inhibitor(s)/anti-deceleration agent(s) is/are present in the fusing agent 26 in an amount of about 0.25 wt % (based on the total wt % of the fusing agent 26). In another example, the scale inhibitor(s)/anti-deceleration agent(s) is/are present in the fusing agent 26 in an amount of about 0.1 wt % (based on the total wt % of the fusing agent 26).

The FA vehicle of the fusing agent 26 may also include chelating agent(s). The chelating agent may be included to eliminate the deleterious effects of heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent 26 may range from 0 wt % to about 2 wt % based on the total wt % of the fusing agent 26. In an example, the chelating agent is present in the fusing agent 26 in an amount of about 0.08 wt % (based on the total wt % of the fusing agent 26). In another example, the chelating agent is present in the fusing agent 26 in an amount of about 0.032 wt % (based on the total wt % of the fusing agent 26).

The FA vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof.

In an example, the fusing agent 26 may include a total amount of antimicrobial agents that ranges from about 0.1 wt % to about 0.35 wt %. In an example, the antimicrobial agent is a biocide and is present in the fusing agent 26 in an amount of about 0.32 wt % (based on the total wt % of the fusing agent 26). In another example, the antimicrobial agent is a biocide and is present in the fusing agent 26 in an amount of about 0.128 wt % (based on the total wt % of the fusing agent 26).

The balance of the fusing agent 26 is water. As an example, deionized water may be used.

In an example, the fusing agent 26 includes from about 1 wt % to about 3 wt % of the discolorable near-infrared absorbing dye, from about 1 wt % to about 5 wt % of the thiol surfactant, from about 5 wt % to about 50 wt % of the reducing agent, and a balance of water (based on the total wt % of the fusing agent 26).

In some examples the fusing agent 26 may include a colorant in addition to the discolorable near-infrared absorbing dye. While the discolorable near-infrared absorbing dye functions as an near-infrared radiation absorber and at least substantially discolors after fusing the build material, the additional colorant may impart color to the fusing agent 26 and the resulting 3D part. The amount of the colorant that may be present in the fusing agent 26 ranges from about 1 wt % to about 10 wt % based on the total wt % of the fusing agent 26. The colorant may be a pigment and/or dye having any suitable color. Examples of the colors include cyan, magenta, yellow, etc. Examples of colorants include dyes, such as Acid Yellow 23 (AY 23), Acid Yellow 17 (AY 17), Acid Red 52 (AR 52), Acid Red 289 (AR 289), Reactive Red 180 (RR 180), Direct Blue 199 (DB 199), or pigments, such as Pigment Blue 15:3 (PB 15:3), Pigment Red 122 (PR 122), Pigment Yellow 155 (PY 155), and Pigment Yellow 74 (PY 74).

In some other examples, the fusing agent 26 excludes a colorant other than the discolorable near-infrared absorbing dye. It may be desirable to exclude the colorant from the fusing agent 26 when the 3D part to be created is to be the color of the polymeric or polymeric composite build material (e.g., white or off-white) or when a colored ink will be applied to the 3D part.

The applicator 24 may be scanned across the build area platform 12 in the direction indicated by the arrow 28, e.g., along the y-axis. The applicator 24 may be, for instance, a thermal inkjet printhead, a piezoelectric printhead, a continuous inkjet printhead, etc., and may extend a width of the build area platform 12. While the applicator 24 is shown in FIG. 1 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the fusing agent 26 over a large area of a layer of polymeric or polymeric composite build material particles 16. The applicator 24 may thus be attached to a moving XY stage or a translational carriage (neither of which is shown) that moves the applicator 24 adjacent to the build area platform 12 in order to deposit the fusing agent 26 in predetermined areas of a layer of the polymeric or polymeric composite build material particles 16 that has been formed on the build area platform 12 in accordance with the method(s) disclosed herein. The applicator 24 may include a plurality of nozzles (not shown) through which the fusing agent 26 is to be ejected.

The applicator 24 may deliver drops of the fusing agent 26 at a resolution ranging from about 300 dots per inch (DPI) to about 1200 DPI. In other examples, the applicator 24 may deliver drops of the fusing agent 26 at a higher or lower resolution. The drop velocity may range from about 5 m/s to about 24 m/s and the firing frequency may range from about 1 kHz to about 100 kHz. In one example, each drop may be in the order of about 10 picoliters (pl) per drop, although it is contemplated that a higher or lower drop size may be used. In some examples, applicator 24 is able to deliver variable size drops of the fusing agent 26.

In some examples of the system 10 disclosed herein, another applicator (not shown) may be included that is capable of applying a colored ink to the 3D part that is formed. This applicator may be similar to or the same as applicator 24. It may be desirable to include this applicator and the colored ink when the 3D part is the color of the polymeric or polymeric composite build material (e.g., white or off-white), and when it is desirable to apply color to the white or off-white 3D part.

An example of a pigment based colored ink may include from about 1 wt % to about 10 wt % of pigment(s), from about 10 wt % to about 30 wt % of co-solvent(s), from about 0.5 wt % to about 2 wt % of dispersant(s), from 0.01 wt % to about 1 wt % of anti-kogation agent(s), from about 0.1 wt % to about 5 wt % of binder(s), from about 0.05 wt % to about 0.1 wt % biocide(s), and a balance of water. An example of a dye based colored ink may include from about 1 wt % to about 7 wt % of dye(s), from about 10 wt % to about 30 wt % of co-solvent(s), from about 0.25 wt % to about 2 wt % of dispersant(s), from 0.05 wt % to about 0.1 wt % of chelating agent(s), from about 0.005 wt % to about 0.2 wt % of buffer(s), from about 0.05 wt % to about 0.1 wt % biocide(s), and a balance of water. Some specific examples of suitable colored inks include a set of cyan, magenta, and yellow inks, such as C1893A (cyan), C1984A (magenta), and C1985A (yellow); or C4801A (cyan), C4802A (magenta), and C4803A (yellow); all of which are available from HP Inc. Other commercially available colored inks include C9384A (printhead HP 72), C9383A (printhead HP 72), C4901A (printhead HP 940), and C4900A (printhead HP 940).

Each of the previously described physical elements may be operatively connected to a controller 30 of the printing system 10. The controller 30 may control the operations of the build area platform 12, the build material supply 14, the build material distributor 18, and the inkjet applicator 24. As an example, the controller 30 may control actuators (not shown) to control various operations of the 3D printing system 10 components. The controller 30 may be a computing device, a semiconductor-based microprocessor, a central processing unit (CPU), an application specific integrated circuit (ASIC), and/or another hardware device. Although not shown, the controller 30 may be connected to the 3D printing system 10 components via communication lines.

The controller 30 manipulates and transforms data, which may be represented as physical (electronic) quantities within the printer's registers and memories, in order to control the physical elements to create the 3D part. As such, the controller 30 is depicted as being in communication with a data store 32. The data store 32 may include data pertaining to a 3D part to be printed by the 3D printing system 10. The data for the selective delivery of the polymeric or polymeric composite build material particles 16, the fusing agent 26, etc. may be derived from a model of the 3D part to be formed. For instance, the data may include the locations on each layer of polymeric or polymer composite build material particles 16 that the applicator 24 is to deposit the fusing agent 26. In one example, the controller 30 may use the data to control the applicator 24 to selectively apply the fusing agent 26. The data store 32 may also include machine readable instructions (stored on a non-transitory computer readable medium) that are to cause the controller 30 to control the amount of polymeric or polymeric composite build material particles 16 that is supplied by the build material supply 14, the movement of the build area platform 12, the movement of the build material distributor 18, the movement of the applicator 24, etc.

As shown in FIG. 1, the printing system 10 may also include a source of near-infrared radiation 34, 34'. In some examples, the source of near-infrared radiation 34, 34' may be in a fixed position with respect to the build material platform 12. In other examples, the source of near-infrared radiation 34, 34' may be positioned to apply near-infrared radiation 44 to the layer of polymeric or polymeric composite build material particles 16 to immediately after the fusing agent 26 has been applied thereto. In the example shown in FIG. 1, the source of near-infrared radiation 34' is attached to the side of the applicator 24 which allows for patterning and heating in a single pass.

The source of near-infrared radiation 34, 34' emits at least some electromagnetic radiation having wavelengths in the near-infrared region (e.g., wavelengths ranging from about 800 nm to about 1400 nm). It is to be understood that the source of near-infrared radiation 34, 34' may, in addition to emitting radiation having wavelengths in the near-infrared region, emit radiation having wavelengths outside of the near-infrared region. As one example, the electromagnetic radiation may range from about 800 nm to about 2 µm. As another example, the electromagnetic radiation may be blackbody radiation with a maximum intensity at a wavelength of about 1100 nm. The source of near-infrared radiation 34, 34' may be near-infrared light sources, such as near-infrared curing lamps, near-infrared light emitting diodes (LED), or lasers with the desirable near-infrared electromagnetic wavelengths. In another example, the source of near-infrared radiation 34, 34' may be a halogen lamp with a power ranging from about 500 watts to about 750 watts and a color temperature ranging from about 2700 K to about 3400 K.

The source of near-infrared radiation 34, 34' may be operatively connected to a lamp/laser driver, an input/output temperature controller, and temperature sensors, which are collectively shown as radiation system components 36. The radiation system components 36 may operate together to control the source of near-infrared radiation 34, 34'. The temperature recipe (e.g., radiation exposure rate) may be submitted to the input/output temperature controller. During heating, the temperature sensors may sense the temperature of the polymeric or polymeric composite build material particles 16, and the temperature measurements may be transmitted to the input/output temperature controller. For example, a thermometer associated with the heated area can provide temperature feedback. The input/output temperature controller may adjust the source of near-infrared radiation 34, 34' power set points based on any difference between the recipe and the real-time measurements. These power set points are sent to the lamp/laser drivers, which transmit appropriate lamp/laser voltages to the source of near-infrared radiation 34, 34'. This is one example of the radiation system components 36, and it is to be understood that other radiation source control systems may be used. For example, the controller 30 may be configured to control the source of near-infrared radiation 34, 34'.

Referring now to FIGS. 2A through 2E, an example of the 3D printing method 100 is depicted. This method 100 may be used to form 3D printed parts having mechanical integrity (e.g., having an ultimate tensile strength ranging from about 40 MPa to about 55 MPa) and being white, off-white, or colored. In other examples, the ultimate tensile strength of the 3D printed part may range from about 40 MPa to about 51 MPa or from about 40 MPa to about 45 MPa.

Prior to execution of the method 100 or as part of the method 100, the controller 30 may access data stored in the data store 32 pertaining to a 3D part that is to be printed. The controller 30 may determine the number of layers of polymeric or polymeric composite build material 16 that are to be formed, and the locations at which the fusing agent 26 from the applicator 24 is to be deposited on each of the respective layers.

As shown in FIGS. 2A and 2B, the method 100 includes applying the polymeric or polymeric composite build material 16. In FIG. 2A, the build material supply 14 may supply the polymeric or polymeric composite build material particles 16 into a position so that they are ready to be spread onto the build area platform 12. In FIG. 2B, the build material distributor 18 may spread the supplied polymeric or polymeric composite build material particles 16 onto the build area platform 12. The controller 30 may execute control build material supply instructions to control the build material supply 14 to appropriately position the polymeric or polymeric composite build material particles 16, and may execute control spreader instructions to control the build material distributor 18 to spread the supplied polymeric or polymeric composite build material particles 16 over the build area platform 12 to form a layer 38 of polymeric or polymeric composite build material particles 16 thereon. As shown in FIG. 2B, one layer 38 of the polymeric or polymeric composite build material particles 16 has been applied.

The layer 38 has a substantially uniform thickness across the build area platform 12. In an example, the thickness of the layer 38 is about 100 μm. In another example, the thickness of the layer 38 ranges from about 50 μm to about 300 μm, although thinner or thicker layers may also be used. For example, the thickness of the layer 38 may range from about 20 μm to about 500 μm, or from about 30 μm to about 300 μm. The layer thickness may be about 2× the particle diameter (as shown in FIG. 2B) at a minimum for finer part definition.

Prior to further processing, the layer 38 of the polymeric or polymeric composite build material particles 16 may be exposed to heating. Heating may be performed to pre-heat the polymeric or polymeric composite build material particles 16, and thus the heating temperature may be below the melting point or softening point of the polymeric or polymeric composite build material particles 16. As such, the temperature selected will depend upon the polymeric or polymeric composite build material particles 16 that are used. As examples, the pre-heating temperature may be from about 5° C. to about 50° C. below the melting point or softening point of the polymeric or polymeric composite build material particles 16. In an example, the pre-heating temperature ranges from about 50° C. to about 250° C. In another example, the pre-heating temperature ranges from about 150° C. to about 170° C.

Pre-heating the layer 38 of the polymeric or polymeric composite build material particles 16 may be accomplished using any suitable heat source that exposes all of the polymeric or polymeric composite build material particles 16 on the build material surface 12 to the heat. Examples of the heat source include a thermal heat source (e.g., a heater (not shown) of the particles 16) or the near-infrared radiation source 34, 34'.

Referring now to FIG. 2C, after the layer 38 is formed, and in some instances is pre-heated, the fusing agent 26 is selectively applied on at least a portion 40 of the polymeric or polymeric composite build material 16.

It is to be understood that a single fusing agent 26 may be selectively applied on the portion 40, or multiple fusing agents 26 may be selectively applied on the portion 40. As an example, multiple fusing agents 26 may be used when the colorant is included in at least one of the multiple fusing agents 26 to create a multi-colored part.

As illustrated in FIG. 2C, the fusing agent 26 may be dispensed from the applicator 24. The applicator 24 may be a thermal inkjet printhead, a piezoelectric printhead, etc., and the selectively applying of the fusing agent 26 may be accomplished by the associated inkjet printing technique. The fusing agent 26 may be dispensed at a contone level ranging from about 10 contone to about 255 contone (which refers to the number of drops, which is divided by 256, that will be placed on average onto each pixel).

The controller 32 may execute instructions to control the applicator 24 (e.g., in the directions indicated by the arrow 28) to deposit the fusing agent 26 onto predetermined portion(s) 40 of the polymeric or polymeric composite build material 16 that are to become part of the 3D part. The applicator 24 may be programmed to receive commands from the controller 30 and to deposit the fusing agent 26 according to a pattern of a cross-section for the layer of the 3D part to be formed. As used herein, the cross-section of the layer of the 3D part to be formed refers to the cross-section that is parallel to the surface of the build area platform 12. In the example shown in FIG. 2C, the applicator 24 selectively applies the fusing agent 26 on those portion(s) 40 of the layer 38 that are to be fused to become the first layer of the 3D part. As an example, if the 3D part that is to be formed is to be shaped like a cube or cylinder, the fusing agent 26 will be deposited in a square pattern or a circular pattern (from a top view), respectively, on at least a portion of the layer 38 of the polymeric or polymeric composite build material particles 16. In the example shown in FIG. 2C, the fusing agent 26 is deposited in a square pattern on the portion 40 of the layer 38 and not on the portions 42.

As mentioned above, the fusing agent 26 may include the discolorable near-infrared absorbing dye and the FA vehicle. In an example, the fusing agent 26 includes the discolorable near-infrared absorbing dye, the thiol surfactant, the reducing agent, and a balance of water. In another example, the fusing agent 26 consists of these components and no other components. In still another example, the fusing agent 26 includes from about 1 wt % to about 3 wt % of the discolorable near-infrared absorbing dye, from about 1 wt % to about 5 wt % of the thiol surfactant, from about 5 wt % to about 50 wt % of the reducing agent, and a balance of water (based on the total wt % of the fusing agent 26). As also mentioned above, in some examples, the fusing agent 26 includes the colorant. In an example, the fusing agent 26 consists of the discolorable near-infrared absorbing dye, the surfactant, the reducing agent, the colorant, and a balance of water. In still other examples, the fusing agent 26 excludes the colorant.

The volume of the fusing agent 26 that is applied per unit of the polymeric or polymeric composite build material 16 in the patterned portion 40 may be sufficient to absorb and convert enough near-infrared radiation 44 so that the polymeric or polymeric composite build material 16 in the patterned portion 40 will fuse. The volume of the fusing agent 26 that is applied may also be sufficient to achieve a desired mechanical integrity (e.g., an ultimate tensile strength ranging from about 40 MPa to about 55 MPa), and/or a desired color density. The volume of the fusing agent 26 that is applied per unit of the polymer or polymeric composite build material 16 may depend, at least in part, on the discolorable near-infrared absorbing dye used, the discolorable near-infrared absorbing dye loading in the fusing agent 26, and the polymeric or polymeric composite build material 16 used.

After selectively applying the fusing agent 26, near-infrared radiation 44 is applied to the polymeric or polymeric composite build material 16. The near-infrared radiation 44 may be applied with the source of near-infrared radiation 34 as shown in FIG. 2D or with the source of near-infrared radiation 34' as shown in FIG. 2C.

The near-infrared radiation 44 is applied at a condition that maintains the temperature of the selectively applied fusing agent 26 below the decomposition temperature of the fusing agent 26. Maintaining the temperature of the selectively applied fusing agent 26 below the decomposition temperature of the fusing agent 26 prevents the components of the fusing agent 26 from decomposing. It is to be understood, however, that the some components of the fusing agent 26 (e.g., FA vehicle components, water, etc.) may evaporate and leave the layer 38. It is also to be understood that some other components (e.g., the discolorable near-infrared absorbing dye in its reduced form) may remain in the layer 38 and ultimately in the fused layer 46.

In some examples, the decomposition temperature of the fusing agent 26 is about 300° C.

The near-infrared radiation 44 is also applied at a condition that allows the discolorable near-infrared absorbing dye to harvest the near-infrared radiation energy 44. The near-infrared energy 44 may be harvested when the absorption maximum wavelength of the dye matches that of the source of near-infrared radiation 34. As such, it may be desirable to utilize a dye and reducing agent combination that will shift the absorption maximum of the dye to the wavelength or within the wavelength range of the source of near-infrared radiation 34. The absorbed and harvested near-infrared radiation 44 may fuse the portion of the polymeric or polymeric composite build material 16 in contact with the fusing agent 26 to form a layer 46, and may initiate or further discoloration of the discolorable near-infrared absorbing dye in the layer 46, even after the application of the radiation 44 ceases.

The fusing agent 26 enhances the absorption of the radiation, converts the absorbed radiation to thermal energy, and promotes the transfer of the thermal heat to the polymeric or polymeric composite build material particles 16 in contact therewith. In an example, the fusing agent 26 sufficiently elevates the temperature of the polymeric or polymeric composite build material particles 16 in layer 38 above the melting or softening point of the particles 16, allowing fusing (e.g., sintering, binding, curing, etc.) of the polymeric or polymeric composite build material particles 16 to take place. The application of the near-infrared radiation 44 forms the fused layer 46, as shown in FIG. 2D.

It is to be understood that portions 42 of the polymeric or polymeric composite build material 16 that do not have the fusing agent 26 applied thereto do not absorb enough radiation to fuse. As such, these portions 42 do not become part of the 3D part that is ultimately formed. The polymeric or polymeric composite build material 16 in portions 42 may be reclaimed to be reused as build material in the printing of another 3D part.

As mentioned above, the discoloration of the discolorable near-infrared absorbing dye is caused by the reduction of the discolorable near-infrared absorbing dye, and is initiated by the application of near-infrared radiation 44. In some examples, the discoloration of the discolorable near-infrared absorbing dye may be completed during the application of the near-infrared radiation 44. In other examples, the method 100 may include allowing the discolorable near-infrared absorbing dye in the layer 46 to continue discoloration in the absence of the applied near-infrared radiation 44. When the discolorable near-infrared absorbing dye in the layer 46 is allowed to continue discoloration in the absence of the applied near-infrared radiation 44, the continued discoloration may be facilitated by the harvested radiation, which generates additional thermal energy in the layer 46.

As also mentioned above, in some examples, the fusing agent 26 includes the colorant, and in other examples the fusing agent 26 excludes the colorant. When the fusing agent 26 includes the colorant, the layer 46 exhibits the color of the colorant after the discolorable near-infrared absorbing dye in the layer 46 undergoes at least substantial discoloration. When the fusing agent 26 excludes the colorant, the layer 46 exhibits the color of the polymeric or polymeric composite build material 16 after the discolorable near-infrared absorbing dye in the layer 46 undergoes at least substantial discoloration. In the latter example, if it is desirable to impart color to the layer 46, the colored ink may be selectively applied to at least a portion of the layer 46.

In an example of the method 100, the discolorable near-infrared absorbing dye in the layer 46 undergoes at least substantial discoloration during the application of the near-infrared radiation 44; and after the application of the near-infrared radiation 44, the layer 46 exhibits the color of the colorant present in the fusing agent 26. In another example of the method 100, the discolorable near-infrared absorbing dye in the layer 46 undergoes at least substantial discoloration during the application of the near-infrared radiation 44; and after the application of the near-infrared radiation 44, the layer 46 exhibits the color of the polymeric or polymeric composite build material 16 when the fusing agent 26 excludes a colorant.

The near-infrared radiation energy 44 is applied at condition(s) that maintain the temperature of the selectively applied fusing agent 26 below its decomposition temperature and that allow the discolorable near-infrared absorbing dye to harvest near-infrared radiation energy 44.

Examples of the conditions at which the near-infrared energy 44 is applied may include a predetermined number of radiation exposure passes at a predetermined speed, a radiation exposure time, a build material platform temperature, or combinations thereof.

When the condition includes the predetermined number of radiation exposure passes at the predetermined speed, the near infrared radiation 44 may be applied using the source of near-infrared radiation 34' (as shown in FIG. 2C). The predetermined number of radiation exposure passes may range from 2 to 4, and the predetermined speed may ranges from about 20 inches per second (ips) to about 30 ips. In some examples, the predetermined number of radiation exposure passes may be 2, and the predetermined speed may range from about 20 ips to about 24 ips. In some other examples, the predetermined number of radiation exposure passes may be 4, and the predetermined speed may range from about 24 ips to about 30 ips.

When the condition includes the radiation exposure time and/or the build material platform temperature, the near infrared radiation 44 may be applied using either the source of near-infrared radiation 34' (as shown in FIG. 2C) or the source of near-infrared radiation 34 (as shown in FIG. 2D). The radiation exposure time is the length of time that the near-infrared radiation 44 is applied for, and may be dependent upon, for example, one or more of: characteristics of the near-infrared radiation 34, 34'; characteristics of the polymeric or polymeric composite build material particles 16; and/or characteristics of the fusing agent 26. In an example, the radiation exposure time ranges from about 5 seconds to about 2 minutes. The build material platform temperature may range from about 100° C. to about 200° C.

The concentration of the fusing agent 26 that is selectively applied may be varied to achieve a desired mechanical integrity (e.g., an ultimate tensile strength ranging from about 40 MPa to about 55 MPa), and/or a desired color density. In some examples, the method 100 may include altering the condition (at which the near-infrared energy 44 is applied) based on the concentration of the fusing agent 26 that is selectively applied. In an example, the condition may be altered by decreasing the radiation exposure time when the concentration of the fusing agent 26 that is selectively applied in increased. As an example, when the contone level of the fusing agent 26 ranges from about 60 to about 255, two passes of radiation exposure may be used. In another example, the condition may be altered by increasing the radiation exposure time when the concentration of the fusing agent 26 that is selectively applied is decreased. As an example, when the contone level of the fusing agent 26 ranges from about 0 to about 60, four passes of radiation exposure may be used.

Figure 2E:
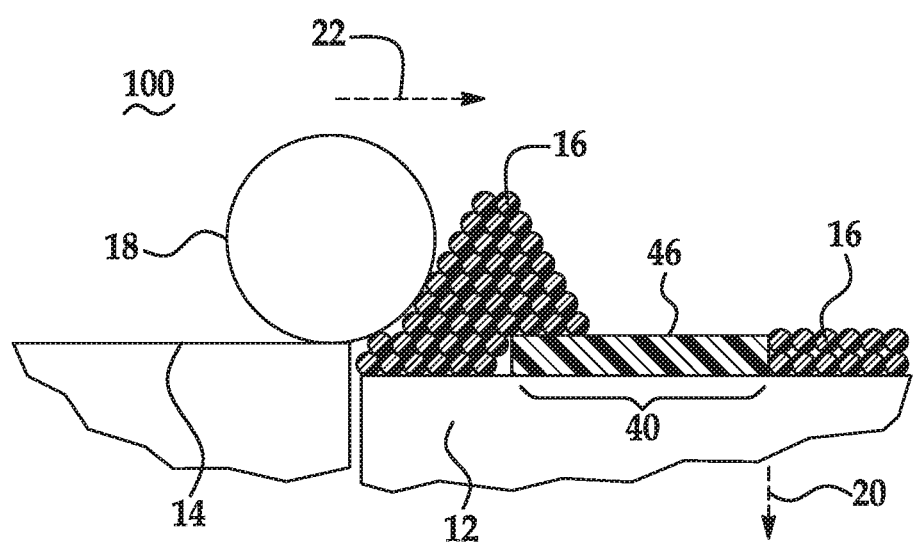

The processes shown in FIGS. 2A through 2E may be repeated to iteratively build up several fused layers and to form the 3D printed part. FIG. 2E illustrates the initial formation of a second layer of polymeric or polymeric composite build material particles 16 on the previously formed layer 46. In FIG. 2E, following the fusing of the predetermined portion(s) 40 of the layer 38 of polymeric or polymeric composite build material 16, the controller 30 may execute instructions to cause the build area platform 12 to be moved a relatively small distance in the direction denoted by the arrow 20. In other words, the build area platform 12 may be lowered to enable the next layer of polymeric or polymeric composite build material particles 16 to be formed. For example, the build material platform 12 may be lowered a distance that is equivalent to the height of the layer 38. In addition, following the lowering of the build area platform 12, the controller 30 may control the build material supply 14 to supply additional polymeric or polymeric composite build material particles 16 (e.g., through operation of an elevator, an auger, or the like) and the build material distributor 18 to form another layer of polymeric or polymeric composite build material particles 16 on top of the previously formed layer with the additional polymeric or polymeric composite build material 16. The newly formed layer may be in some instances preheated, patterned with the fusing agent 26, and then exposed to near-infrared radiation 44 from the source of near-infrared radiation 34, 34' to form the additional fused layer.

Figure 3:
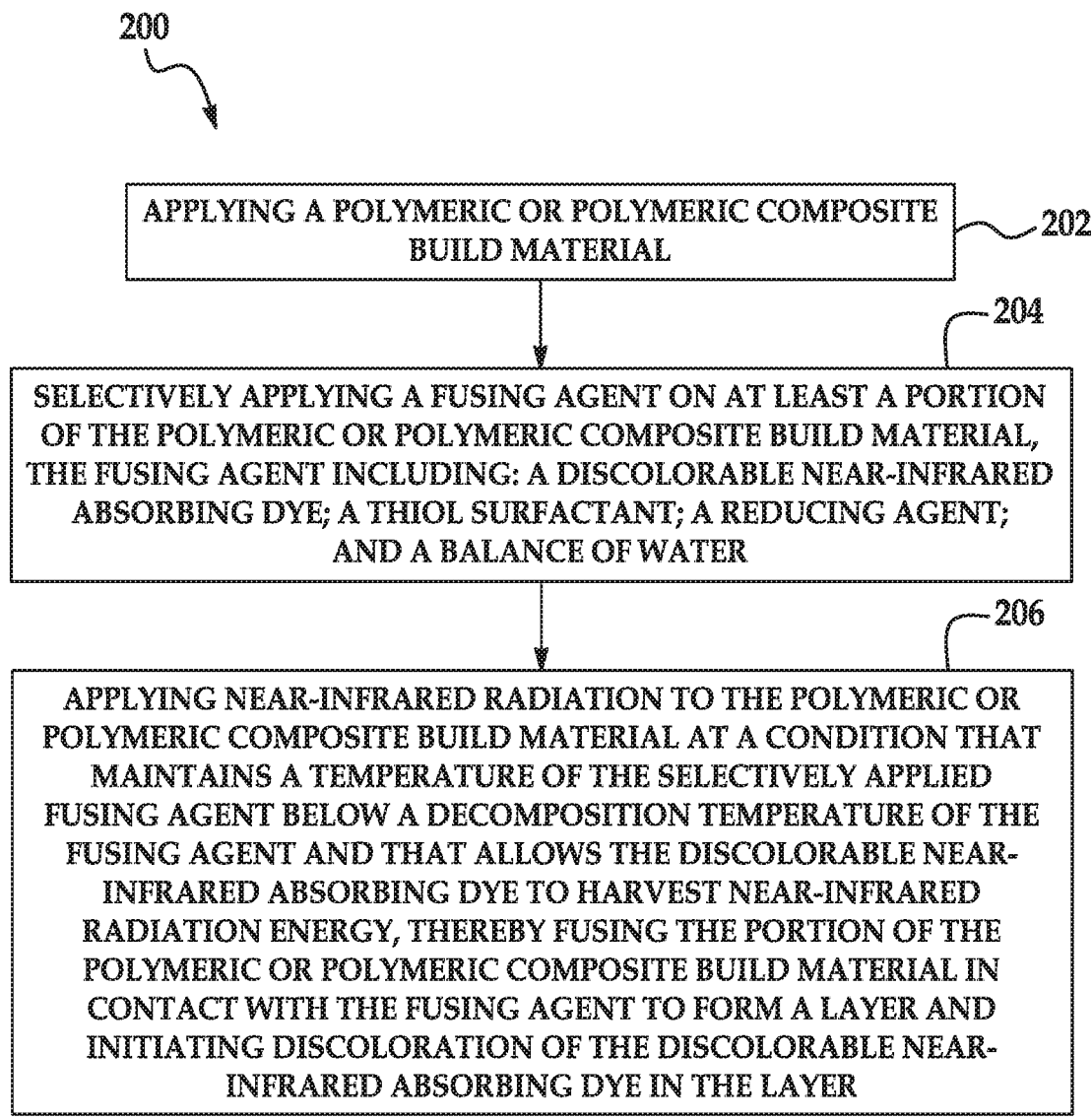
FIG. 3 is a flow diagram illustrating an example of a 3D printing method disclosed herein.

An example of the 3D printing method 200 is depicted in FIG. 3. It is to be understood that examples of the method 200 shown in FIG. 3 are discussed in detail herein, e.g., in FIGS. 2A-2D and the text corresponding thereto.

As shown at reference numeral 202, the method 200 includes applying the polymeric or polymeric composite build material 16.

As shown at reference numeral 204, method 200 further includes selectively applying the fusing agent 26 on at least a portion 40 of the polymeric or polymeric composite build material 16, the fusing agent 26 including: a discolorable near-infrared absorbing dye; a thiol surfactant; a reducing agent; and a balance of water.

As shown at reference numeral 206, method 200 further includes applying near-infrared radiation to the polymeric or polymeric composite build material 16 at a condition that maintains a temperature of the selectively applied fusing agent 26 below a decomposition temperature of the fusing agent 26 and that allows the discolorable near-infrared absorbing dye to harvest near-infrared radiation energy, thereby fusing the portion 40 of the polymeric or polymeric composite build material 16 in contact with the fusing agent 26 to form the layer 46 and initiating discoloration of the discolorable near-infrared absorbing dye in the layer 46.

To further illustrate the present disclosure, an example is given herein. It is to be understood that this example is provided for illustrative purposes and is not to be construed as limiting the scope of the present disclosure.

EXAMPLE

Three example 3D parts were printed (referred to as "example part 1," "example part 2," and "example part 3").

Example part 1 was printed using polyamide-12 (PA-12 z2723) as the build material and an example fusing agent containing nickel dithiolene, dodecanethiol, and 1-methyl-2-pyrrolidone. The nickel dithiolene changed from green to reddish brown during the formation of the fusing agent. Each layer of example part 1 was printed with a fusing agent contone level of 60 contone. When the fusing agent was dispensed on each layer of the build material, the color of the build material appeared red. Then, near-infrared radiation was applied to each layer of example part 1 for 19 seconds. The build material platform temperature was 150° C. 100 layers were printed. After the application of the near-infrared radiation, each layer (and thus example part 1) changed color from red to white. It is believed that the discoloration of each layer takes place, at least in part, during the application of the near-infrared energy.

Example part 2 was printed using polyamide-12 (PA-12× 1556) as the build material and an example fusing agent containing nickel dithiolene, dodecanethiol, and 1-methyl-2-pyrrolidone. The nickel dithiolene changed from green to reddish brown during the formation of the fusing agent. Each layer of example part 2 was printed with a fusing agent contone level of 40 contone. When the fusing agent was dispensed on each layer of the build material, the color of the build material appeared red. Then, near-infrared radiation was applied to each layer of example part 2 for 30 seconds. The build material platform temperature was 150° C. 100 layers were printed. After the application of the near-infrared radiation, each layer (and thus example part 2) changed color from red to white. It is believed that the discoloration of each layer takes place, at least in part, during the application of the near-infrared energy.

Example part 3 was printed using polyamide-12 (PA-12× 1556) as the build material and an example fusing agent containing nickel dithiolene, dodecanethiol, and 1-methyl-2-pyrrolidone. The nickel dithiolene changed from green to reddish brown during the formation of the fusing agent. Each layer of example part 3 was printed with a fusing agent contone level of 20 contone. Then, near-infrared radiation was applied to each layer of example part 3 for 30 seconds. The build material platform temperature was 150° C. 20 layers were printed. After the application of the near-infrared radiation, each layer (and thus example part 3) changed color from red to white. It is believed that the discoloration of each layer takes place, at least in part, during the application of the near-infrared energy.

It is to be understood that the ranges provided herein include the stated range and any value or sub-range within the stated range. For example, a range from about 1 wt % to about 3 wt % should be interpreted to include not only the explicitly recited limits of from about 1 wt % to about 3 wt %, but also to include individual values, such as 1.35 wt %, 1.55 wt %, 2.5 wt %, 2.85 wt %, etc., and sub-ranges, such as from about 1.35 wt % to about 2.5 wt %, from about 1.5 wt % to about 2.7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
applying a polymeric or polymeric composite build material;
selectively applying a fusing agent on at least a portion of the polymeric or polymeric composite build material, the fusing agent including:
a discolorable near-infrared absorbing dye;
a thiol surfactant; a reducing agent; and a balance of water; and
applying near-infrared radiation to the polymeric or polymeric composite build material at a condition that maintains a temperature of the selectively applied fusing agent below a decomposition temperature of the fusing agent and that allows the discolorable near-infrared absorbing dye to harvest near-infrared radiation energy, thereby fusing the portion of the polymeric or polymeric composite build material in contact with the fusing agent to form a layer and initiating discoloration of the discolorable near-infrared absorbing dye in the layer, wherein the discolorable near-infrared absorbing dye has a general formula I:

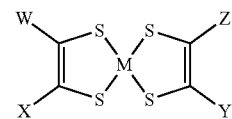

wherein:
M is a metal selected from the group consisting of nickel, zinc, platinum, palladium, and molybdenum; and
each of W, X, Y, and Z is selected from the group consisting of H, Ph, PhR, and SR, wherein Ph is a phenyl group and R is selected from the group consisting of $C_nH_{2n}+1$, $OC_nH_{2n}+1$, and $N(CH_3)_2$, wherein $2<n<12$.

2. The 3D printing method as defined in claim 1 wherein the condition includes:
a predetermined number of radiation exposure passes at a predetermined speed;
a radiation exposure time ranging from about 5 seconds to about 2 minutes;
a build material platform temperature ranging from about 100° C. to about 200° C.; or
combinations thereof.

3. The 3D printing method as defined in claim 2 wherein the condition includes the predetermined number of radiation exposure passes at the predetermined speed, the predetermined number of radiation exposure passes is 2, and the predetermined speed ranges from about 20 inches per second to about 24 inches per second.

4. The 3D printing method as defined in claim 2 wherein the condition includes the predetermined number of radiation exposure passes at the predetermined speed, the predetermined number of radiation exposure passes is 4, and the predetermined speed ranges from about 24 inches per second to about 30 inches per second.

5. The 3D printing method as defined in claim 2, further comprising altering the condition based on a concentration of the fusing agent that is selectively applied.

6. The 3D printing method as defined in claim 5 wherein the altering of the condition includes one of:
decreasing the radiation exposure time when the concentration of the fusing agent that is selectively applied is increased; or
increasing the radiation exposure time when the concentration of the fusing agent that is selectively applied is decreased.

7. The 3D printing method as defined in claim 1, further comprising allowing the discolorable near-infrared absorbing dye in the layer to continue discoloration in the absence of the applied near-infrared radiation.

8. The 3D printing method as defined in claim 7 wherein one of:
- the fusing agent further includes a colorant, and the layer exhibits a color of the colorant after the discolorable near-infrared absorbing dye in the layer undergoes at least substantial discoloration; or
- the fusing agent excludes a colorant, and the layer exhibits a color of the polymeric or polymeric composite build material after the discolorable near-infrared absorbing dye in the layer undergoes at least substantial discoloration.

9. The 3D printing method as defined in claim 1 wherein during the application of the near-infrared radiation, the discolorable near-infrared absorbing dye in the layer undergoes at least substantial discoloration, and after the application of the near-infrared radiation, one of:
- the layer exhibits a color of a colorant present in the fusing agent; or
- the layer exhibits a color of the polymeric or polymeric composite build material when the fusing agent excludes a colorant.

10. The method as defined in claim 1 wherein the selectively applying of the fusing agent is accomplished by thermal inkjet printing or piezo electric inkjet printing.

11. The method as defined in claim 1 wherein: the reducing agent is a polar aprotic solvent selected from the group consisting of 1-methyl-2-pyrrolidone, 2-pyrrolidone, 1-(2-hydroxyethyl)-2-pyrrolidone, dimethylformamide (DMF), dimethyl sulfoxide (DMSO), acetone, and combinations thereof; and the thiol surfactant is dodecanethiol.

12. The method as defined in claim 11 wherein:
- the discolorable near-infrared absorbing dye is present in the fusing agent in an amount ranging from about 1 wt % to about 3 wt % based on a total wt % of the fusing agent;
- the thiol surfactant is present in the fusing agent in an amount ranging from about 1 wt % to about 3 wt % based on the total wt % of the fusing agent; and
- the polar aprotic solvent is present in the fusing agent in an amount ranging from about 5 wt % to about 50 wt % based on the total wt % of the fusing agent.

13. The method as defined in claim 1 wherein the discolorable near-infrared absorbing dye is selected from the group consisting of a diarylmethane dye, a triarylmethane dye, a tetraryldiamine dye, a nitroso dye, a cyanine dye, a nigrosine dye, an iminium dye, a diimminum dye, a squarilium dye, a croconium dye, a quinone dye, a phthalocyanine dye, an azo dye and an indoaniline dye.

* * * * *